United States Patent
Suzuki (10) Patent No.: US 6,301,345 B1
(45) Date of Patent: Oct. 9, 2001

(54) KEY TELEPHONE SYSTEM AND MAINTENANCE METHOD THEREFOR

(75) Inventor: Takafumi Suzuki, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/276,984

(22) Filed: Mar. 26, 1999

(30) Foreign Application Priority Data

Aug. 24, 1998 (JP) .................................................. 10-237401

(51) Int. Cl.⁷ .............................. H04M 1/00; H04M 1/24
(52) U.S. Cl. ...................... 379/156; 379/1.01; 379/9.01; 379/12; 379/22.02; 379/157
(58) Field of Search .................................... 379/156, 157, 379/161, 165, 182, 187, 189, 198, 199, 88.05, 88.17, 93.05, 93.11, 1, 9, 10, 27, 29, 32, 34, 6, 12, 22

(56) References Cited

U.S. PATENT DOCUMENTS

| | | | |
|---|---|---|---|
| 5,276,867 | * | 1/1994 | Kenley et al. ........................ 395/600 |
| 5,309,509 | * | 5/1994 | Cocklin et al. ...................... 379/165 |
| 5,452,339 | * | 9/1995 | Siu et al. ................................ 379/27 |
| 6,044,136 | * | 3/2000 | Takahashi et al. ................. 379/93.23 |

* cited by examiner

Primary Examiner—Binh Tieu
(74) Attorney, Agent, or Firm—Pearne & Gordon LLP (57) ABSTRACT

There is described a key telephone system which enables rewriting of the main program of the key telephone system, recovery of the key telephone system from a failure, and maintenance of the key telephone system such as diagnosis in an immediate, flexible, and inexpensive manner, a maintenance method for the key telephone system, and a medium on which is recorded a program for carrying out the maintenance method. A program to be rewritten is downloaded from an external device to a second storage means. After an existing program of a storage means has been saved into the second storage means, the downloaded program stored in the second storage means is transmitted and rewritten into the storage means. Failure information recording means records information regarding at least failures that occur at the time of downloading the program, failures that occur at the time of saving the existing program, and failures that occur at the time of rewriting the downloaded program. In the event of a failure, the key telephone system recovers from a failure by reference to the failure information recorded by the failure information recording means.

10 Claims, 6 Drawing Sheets

FAILURE FLAG REGISTER

DLEF : DOWNLOAD FAILURE FLAG
MEEF : MAIN SAVING FAILURE FLAG
OWEF : MAIN REWRITING FAILURE FLAG
D.C. : UNDEFINED

KEY TELEPHONE SYSTEM AND MAINTENANCE METHOD THEREFOR

BACKGROUND OF THE INVENTION

1. Field of the Invention

The present invention relates to a key telephone system (hereinafter often referred to simply as "KTS"), a maintenance method therefor, and a medium on which is recorded a program for executing the maintenance method. More particularly, the present invention relates to a key telephone system which immediately and flexibly performs, at low cost and through remote control, a change in the main program of the key telephone system, recovery from failures, and maintenance operations such as diagnosis; to a maintenance method for the key telephone system; and to a medium for recording a program for executing the maintenance method.

2. Description of the Related Art

Like a private branch exchange (PBX), various key telephone systems have already been proposed as a system for providing business users with telephone exchange service. The PBX originated as an exchange for connecting private telephone lines, and during the course of its development a function of connecting the private telephone lines to a telephone network has been added to the PBX. In contrast, the key telephone system originated from the idea of making convenient connection to the telephone network through use of a plurality of telephone sets; for example, through switching of branch telephones. The function of inter-communication between extensions was later added to the key telephone system. In recent years, there has been no definite distinction between the PBX and the KTS, and a choice between the PBX and the KTS is a mere matter of the user's preference.

Figure 8:
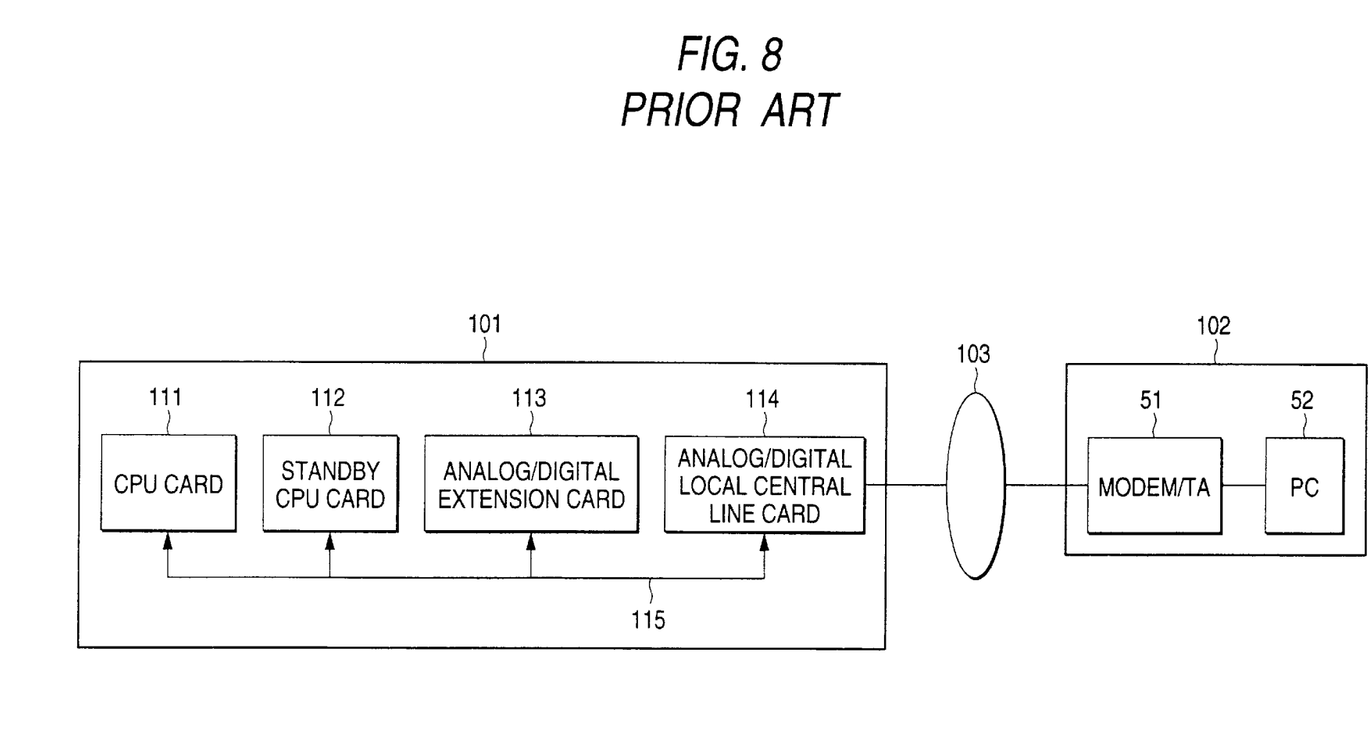
FIG. 8 is a diagrammatic representation showing a telephone network system using a conventional key telephone system.

FIG. 8 shows the configuration of a telephone network system using such key telephone systems. A conventional key telephone system 101 has two built-in CPU cards 111, 112, in that the CPU card 111 is used as a main CPU card and the CPU card 112 is used as a standby CPU card. The KTS 101 further comprises a built-in analog/digital extension card 113 to be used as an extension interface card and a built-in analog/digital outside line card 114 to be used as an outside line interface card. These four cards 111 to 114 are connected together by way of a system bus and a system PCM highway 115.

The KTS 101 is connected to an analog/digital network 103 by way of the analog/digital outside line card 114 and is further connected to a maintenance site 102 by way of the analog/digital network 103. The maintenance site 102 is made up of a MODEM/TA (modem or a terminal adapter) 51 and a PC (personal computer) 52 and performs maintenance remotely.

The maintenance of such a conventional KTS 101 will now be described. The main program of the KTS 101 is changed on-site through operations such as exchange of memory, or a CPU card, of the KTS 101. Recovery of the KTS 101 from failures is performed by remotely switching the CPU card 111 to the standby CPU card 112. Further, the KTS 101 is diagnosed by means of operations performed through a digital telephone set or personal computer disposed at the client's location. To remotely diagnose the KTS 101, a diagnostic program incorporated into the KTS 101 beforehand is activated, and the result of such diagnosis is remotely transmitted to equipment installed at a remote site.

As mentioned above, with regard to the conventional key telephone system and the maintenance method therefor, and the medium for recording the program for executing the maintenance program, remotely changing the main program of the key telephone system requires two CPU cards, i.e., the main CPU card and the standby CPU card, thereby increasing the cost of the key telephone system. Further, providing two CPU cards to a key telephone system which usually operates through use of a single CPU card is wasteful even in terms of system configuration.

To remotely diagnose the key telephone system, one type of diagnostic program previously incorporated into the key telephone system is activated irrespective of system configuration. Accordingly, flexible and immediate activation of a relevant diagnostic program corresponding to the installation conditions of the key telephone system or to the nature of failure has been impossible. Further, if maintenance personal desires to change the built-in diagnostic program of the key telephone system, the CPU cards of the key telephone systems disposed at the client's location must be exchanged, thereby requiring an enormous amount of time and money.

SUMMARY OF THE INVENTION

The present invention has been achieved in view of the foregoing circumstances of the conventional key telephone system, and the object of the present invention is to provide a key telephone system, a maintenance method for the key telephone system, and a medium for recording a program for executing the maintenance method. They enable rewriting of a main program of the key telephone system, recovery from failures, and maintenance operations such as diagnosis, in an immediate, flexible, and inexpensive manner by remote control.

To solve the foregoing problems, according to a first aspect of the present invention, there is provided a key telephone system comprising: first storage means which stores a program of the key telephone system; operation control means which operates and controls the key telephone system through execution of the program stored in the first storage means; second storage means which stores a program; downloading means which downloads an alternative program to be rewritten from an external device to the second storage means; and control means which saves the program stored in the first storage means into the second storage means and which transmits and rewrites the alternative program stored in the second storage means to the first storage means.

According to a second aspect of the present invention, there is provided a key telephone system comprising: first storage means which stores a program of the key telephone system; operation control means which operates and controls the key telephone system through execution of the program stored in the first storage means; second storage means which stores a program; downloading means which downloads an alternative program to be rewitten from an external device to the second storage means; control means which saves the program stored in the first storage means into the second storage means and which transmits and rewrite the alternative program stored in the second storage means to the first storage means; failure information recording means which records information regarding at least failures that occur during the downloading of the alternative program by the downloading means and failures that occur during the saving, transmitting and writing of the alternative program over the program stored in the first storage means by the control means; and recovery means which recovers the key telephone system by reference to the failure information recorded in the failure information recording means in case of occurrence of failure.

According to a third aspect of the present invention, there is provided a key telephone system comprising: first storage means which stores a program of the key telephone system; operation control means which operates and controls the key telephone system through execution of the program stored in the first storage means; second storage means which stores a diagnostic program; downloading means which downloads an alternative diagnostic program from an external device to the second storage means; control means which saves a diagnostic program having been stored in a first area in the second storage means into a second area in the second storage means and which transmits and rewrites the alternative diagnostic program stored in the second area of the second storage means to the first area; diagnostic means which diagnoses the state of a line connected to the key telephone system according to a diagnostic program stored in the first area of the second storage means, through transmission and receipt of a signal.

Preferably, the second storage means, the downloading means, the control means, the failure information recording means, and the recovery means or the diagnostic means are assembled into a single module and handled, as such.

Preferably, the result of processing performed by the control means, and the failure information recorded in the failure information recording means or the result of diagnosis performed by the diagnostic means, are noticed to the external device.

Preferably, the external device is connected to the key telephone system by way of an analog or digital network, so that the key telephone system is remotely controlled.

According to a fourth aspect of the present invention, there is provided a method of performing maintenance of a key telephone system including storage means which stores a program and operation control means which operates and controls the key telephone system through execution of the program stored in the storage means, the key telephone system maintenance method comprising: a download step for downloading from an alternative program to be rewritten from an external device to a second storage means; a saving step for saving the program stored in the storage means into the second storage means; and a rewriting step for transmitting and rewriting the alternative program stored in the second storage means into the storage means through transmission.

According to a fifth aspect of the present invention, there is provided a method of performing maintenance on a key telephone system including storage means which stores a program and operation control means which operates and controls the key telephone system through execution of the program stored in the storage means, the key telephone system maintenance method comprising: a download step for downloading an alternative program to be rewritten from an external device to second storage means; a saving step for saving the program stored in the storage means into the second storage means; a rewriting step for transmitting and rewriting the alternative program stored in the second storage means into the storage means through transmission; a failure information recording step for recording information regarding at least failures that occur in the download step, the saving step, and the overwriting step, and a recovery step for recovering the key telephone system by reference to the failure information recorded in the failure information recording step.

According to a sixth aspect of the present invention, there is provided a method of performing maintenance of a key telephone system including storage means which stores a program and operation control means which operates and controls the key telephone system through execution of the program stored in the storage means, the key telephone system maintenance method comprising: a download step for downloading a program to be changed from an external device to second storage means; a saving step for saving the existing program stored in a first area of the second storage means into a second area of the second storage means; a rewriting step for transmitting and rewriting the alternative program stored in the second area of the second storage means into the first area of the storage means; and a diagnosing step for diagnosing the state of a line connected to the key telephone system according to a diagnostic program stored in the second storage means, through transmission and receipt of a signal.

Preferably, the result of processing performed by the control means, and the failure information recorded in the failure information recording means or the result of diagnosis performed by the diagnostic means are communicated to the external device.

Preferably, the external device is connected to the key telephone system by way of an analog or digital network, so that the key telephone system is remotely controlled.

Preferably, the key telephone system maintenance method is stored in a computer-readable recording medium in the form of a program for causing a computer to execute the key telephone system maintenance method.

In the foregoing key telephone system, key telephone system maintenance method, and recording medium, the download means downloads an alternative program to be rewritten to the second storage means from the external device (in the download step), and the control means saves the program stored in the first storage means into the second storage means (in the saving step). The control means rewrites the alternative program stored in the second storage means into the first storage means (in the rewriting step). As a result, the alternative program stored in the second storage means is transmitted to and rewritten into the first storage means. Compared with conventional changing of a program through on-site replacement of memory or a CPU card, a program can be changed without involving massive amounts of time and money. Further, the program according to which operations of the key telephone system are controlled can be changed immediately and inexpensively.

Further, in the foregoing key telephone system, key telephone system maintenance method, and recording medium, the download means downloads from the external device an alternative program to be rewritten into the second storage means (in the download step), and the control means saves into the second storage means the program stored in the first storage means (in the saving step). The control means transmits and rewrites the downloaded alternative program stored in the second storage means into the first storage means (in the rewriting step). The failure information recording means (in the failure information recording step) records information regarding at least failures that occur by the downloading action of the download means (in the download step), failures that have been caused by the saving action of the control means (in the saving step), and failures that have been caused by the rewriting action of the control means (in the rewriting step). Further, in the event of a failure, the recovery means recovers the key telephone system (in the recovery step) by reference to the failure information recorded by the failure information recording means (in the failure information recording step). As a result, by reference to the recorded failure information, a decision is made as to when the failure occurred; i.e., in the download step, in the saving step, and in the rewriting step. The rewriting of the main program can be resumed from the processing step in which the failure occurred. So long as after recovery of the key telephone system the processing is resumed from the processing step in which the failure occurred, the time required for rewriting the program can be eventually shortened. Further, self-recovery functions are provided to the key telephone system beforehand so as to correspond to various failures, so that the key telephone system is prevented from being inactive at the time of various maintenance operations.

Further, in the foregoing key telephone system, key telephone system maintenance method, and recording medium, the download means downloads from the external device a program to be changed in the second storage means (in the download step), and the control means saves the existing program stored in a first area of the storage means into another memory location of the second storage means (in the saving step). The control means rewrites the existing program in the second storage means with the diagnostic program downloaded in the second storage means. According to the diagnostic program stored in the second storage means, the diagnostic means diagnoses the state of a line connected to the key telephone system through transmission and receipt of a signal (in the diagnosing step). Thus, the existing diagnostic program previously stored in the second storage means or an arbitrary diagnostic program downloaded from an external device is executed. As a result, even when a key telephone system is installed in a remote location, a failure of the key telephone system can be diagnosed. More specifically, the key telephone system can be immediately and inexpensively diagnosed without direct dispatch of a maintenance technician to the location where the key telephone system is installed. Further, since the diagnostic program can be changed by way of the external device, a relevant diagnostic program corresponding to the location—the installation conditions of the key telephone system and a failure of the key telephone system—can be immediately and flexibly activated.

In the foregoing key telephone system, the second storage means, the downloading means, the control means, the failure information recording means, and the recovery means or the diagnostic means are assembled into a single module and handled, as such. So long as the module is, for example, implemented in the form of a card or mounted on a printed board having a predetermined shape, the handling of the module can be facilitated during maintenance, thereby facilitating, e.g., replacement of the module. In contrast with a conventional key telephone system having a standby CPU card, the conventional key telephone system according to the present invention has another card in place of the standby CPU card. The card according to the present invention enables fulfilling of various types of maintenance functions. Compared with the conventional key telephone system, the key telephone system according to the present invention enables more efficient utilization of space (or the volume occupied by the card).

Further, in the foregoing key telephone system, key telephone system maintenance method, and recording medium, the result of processing performed by the control means (in the rewriting step), and the failure information recorded in the failure information recording means (in the failure information recording step) or the result of diagnosis performed by the diagnostic means (in the diagnostic step) are preferably communicated to the external device. As a result, the changing of the program of the key telephone system, the recovery of the key telephone system from a failure, and system diagnosis can be flexibly and immediately carried out without direct dispatch of a maintenance technician to the location where the key telephone system is installed.

Further, in the foregoing key telephone system, key telephone system maintenance method, and recording medium, the external device is preferably connected to the key telephone system by way of an analog or digital network, so that the key telephone system is remotely controlled. As a result, the changing of the program of the key telephone system, the recovery of the key telephone system from a failure, and system diagnosis can be flexibly and immediately carried out without direct dispatch of a maintenance technician to the location where the key telephone system is installed. Therefore, compared with the maintenance of a conventional key telephone system which would require an enormous amount of time and money, the maintenance of the key telephone system according to the present invention can be performed with minimum expenditure of time and money.

DETAILED DESCRIPTION OF THE PREFERRED EMBODIMENTS

A key telephone system, a maintenance method therefor, and a medium for recording a program for executing the maintenance method, according to the present invention will now be described in detail by reference to the accompanying drawings. In the preferred embodiments, there is given a detailed explanation of the key telephone system and a maintenance method therefor according to the present invention. However, a recording medium according to the present invention records a program for executing the maintenance method, and hence its explanation is included in the explanation of the maintenance method, which will be provided later.

Figure 1:
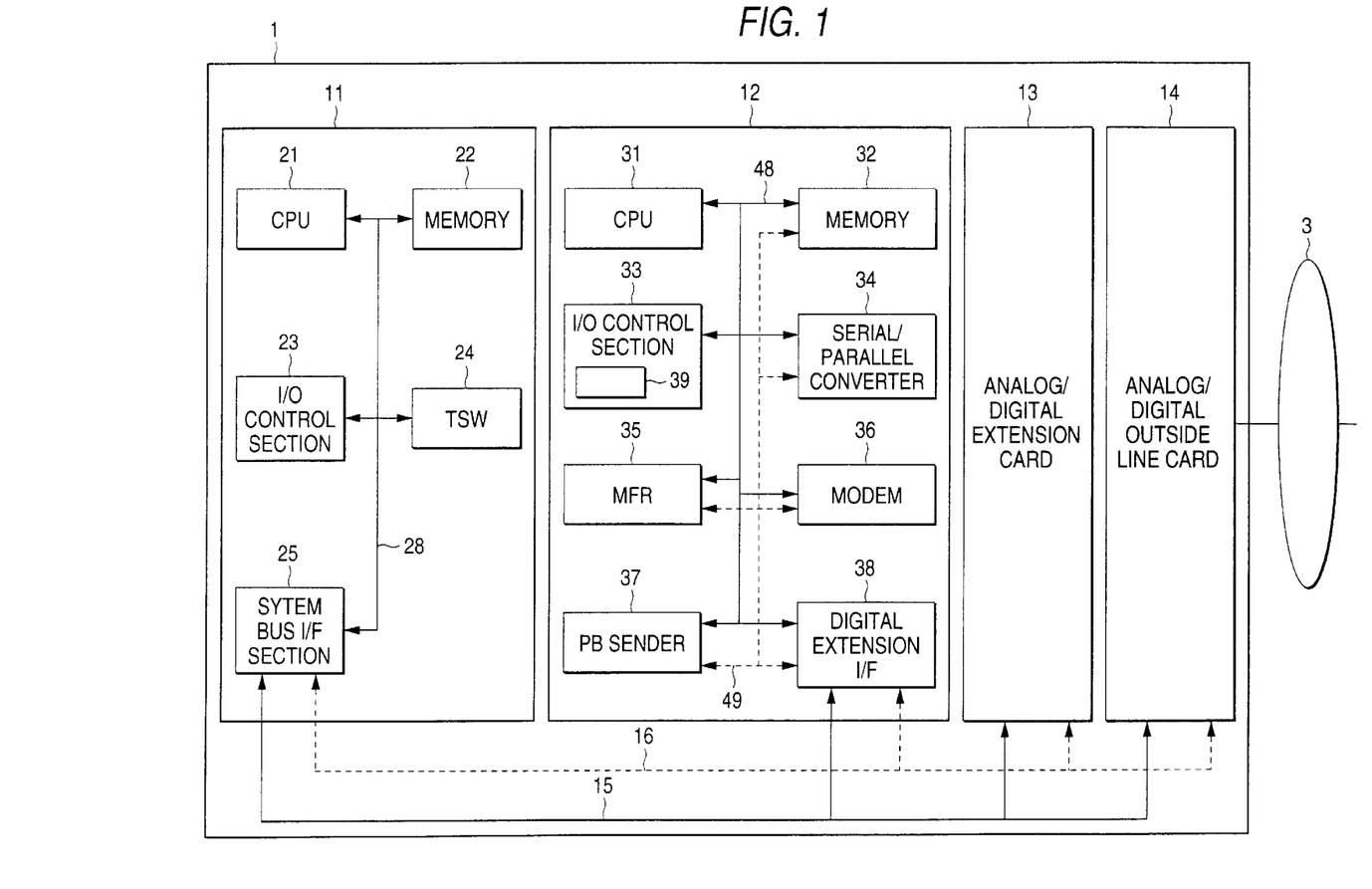
FIG. 1 is a schematic diagram showing the configuration of a key telephone system according to one embodiment of the present invention.

FIG. 1 is a schematic diagram showing a key telephone system, according to one embodiment of the present invention, to which a maintenance method is applied. FIG.

Figure 2:
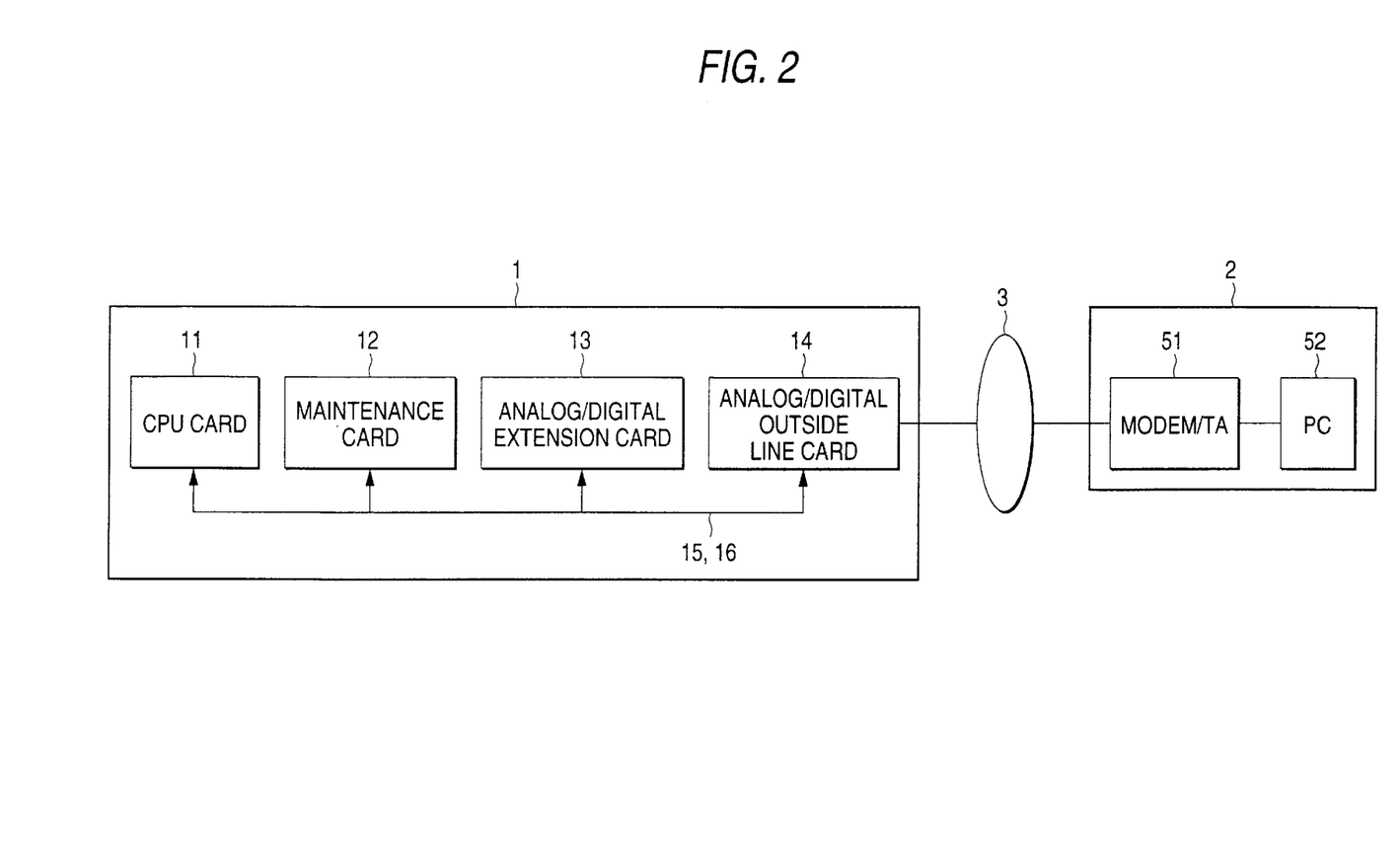
FIG. 2 is a schematic diagram showing the configuration of a telephone network system using the key telephone system according to the present embodiment.

2 is a schematic diagram showing a telephone network system using the key telephone system according to the present embodiment.

In FIGS. 1 and 2, a key telephone system (hereinafter referred to simply as "KTS") 1 according to the present embodiment substantially comprises a CPU card 11, a maintenance card 12, an analog/digital extension card 13 to be used as an extension interface card, and an analog/digital outside line card 14 to be used as an outside line card. These four cards 11 to 14 are connected together by way of a system bus 15 and a system PCM highway 16.

In FIG. 2, the KTS 1 is connected to an analog/digital network 3 by way of the analog/digital center office line card 14 and is further connected to a maintenance site 2 by way of the analog/digital network 3. The maintenance site 2 comprises a MODEM/TA (modem or terminal adapter) 51 and a PC (personal computer) 52 and remotely performs maintenance of the KTS 1 from the outside; namely, a change in the main program of the KTS 1, the recovery of the KTS 1 from a failure, a change in a diagnostic program, or a diagnosing operation performed by the diagnostic program.

Subsequently, the configuration of the CPU card 11, the maintenance card 12, the analog/digital extension card 13, and the analog/digital outside line card 14, which constitute the KTS 1, is described in detail with reference to FIG. 1. The analog/digital extension card 13 and the analog/digital outside line card 14 are equal in configuration to those used in the conventional example, and hence explanation of their detailed configurations will be omitted here.

First, the CPU card 11 comprises a CPU 21 for controlling the overall operations of the KTS 1, memory 22 for retaining a main program or preset data for respective functions; an I/O control section 23 for controlling input/output of signals between the CPU 21 and peripheral circuits thereof; a time switch (hereinafter abbreviated as "TSW") for controlling a call; and a system I/F section 25 which controls interface between the KTS 1 and another card. These constituent elements are connected together by way of a card internal bus 28.

The maintenance card 12 comprises a CPU 31 for controlling operations of the maintenance card 12; memory 32 which retains a program, such as a diagnostic program, to be executed by the CPU 31 and data sets to be used for effecting various functions and which ensures an area into which the main program of the CPU 21 is downloaded or saved; an I/O control section 33 for controlling input and output of signals between the CPU 31 and peripheral circuits thereof; a multi-frequency receiving section 35 (hereinafter abbreviated as "MFR") for receiving various tone signals; a PB signal sender 37 for sending various tone signals; a serial-to-parallel converter 34 for converting PCM serial data into parallel data; a modem (MODEM) 36 for governing modem communication performed by way of an analog outside line; and a digital extension I/F section 38 for governing interface between the KTS 1 and another card. These constituent elements are connected together by way of a card internal bus 48 and a PCM highway 49.

With regard to the KTS 1 according to the present embodiment having the foregoing constitution, the remote maintenance function of the KTS 1 will be described in detail, for the respective functions of a change in the main program, recovery of the KTS 1 from a failure, a change in the diagnostic program, and diagnostic processing. In the present embodiment, a term "external device" referred to in appended claims of the present patent specification corresponds to the maintenance site 2. Similarly, a term "storage means" referred to in the appended claims corresponds to the memory 22 of the CPU card 11; and a term "operation control means" referred to in the appended claims corresponds to the CPU 21 of the CPU card 11. Further, a term "second storage means" referred to in the appended claims corresponds to the memory 32 of the maintenance card 12; and a term "downloading means" referred to in the appended claims corresponds to the CPU 31, the I/O control section 33, the digital extension I/F section 38, and the serial-to-parallel conversion section 34 or the MODEM 36 of the maintenance card 12. Further, a term "control means" referred to in the appended claims corresponds to the CPU 31, the I/O control section 33, and the digital extension I/F section 38 of the maintenance card 12.

Figure 3:
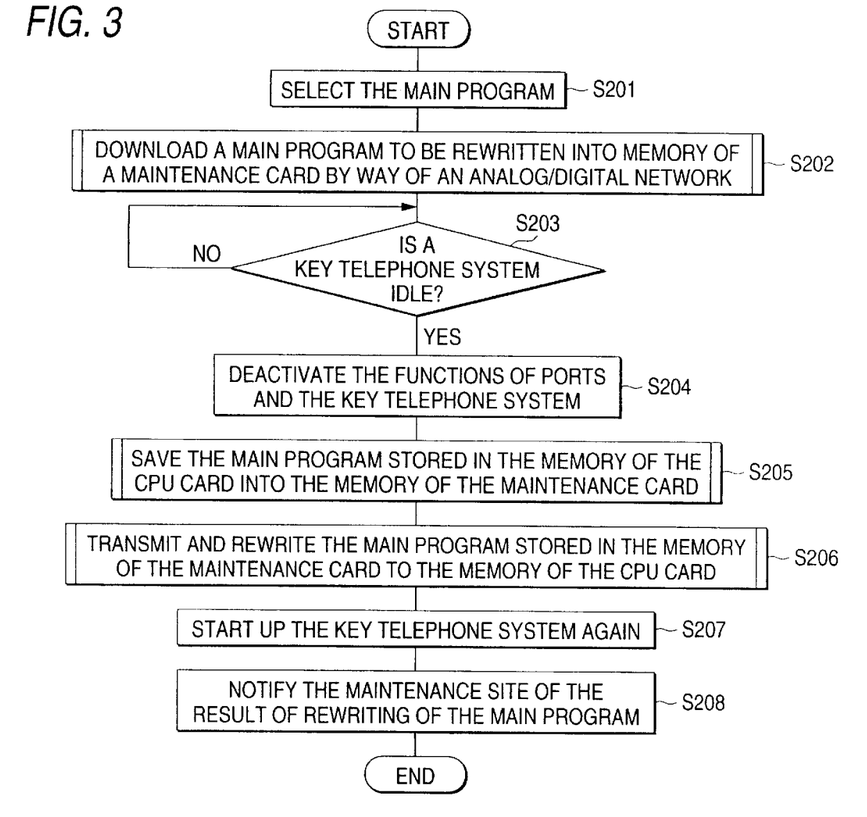
FIG. 3 is a flowchart for describing the rewriting of a main program of the key telephone system according to the present embodiment.

First, the first remote maintenance function of the KTS 1, i.e., changing of the main program of the CPU 21, will be described in detail by reference to FIG. 3.

In step S201, the PC 52 disposed at the maintenance site 2 selects a main program to be changed. In step S202, the main program to be changed is downloaded to the memory 32 of the maintenance card 12 by way of the digital/analog network 3. More specifically, the thus-selected main program is delivered to the analog/digital outside line card 14 by means of the MODEM/TA 51 through modem communication or B-channel data communication of the digital network. The thus-delivered signal is transmitted to the maintenance card 12 by means of control of the CPU 21, the I/O control section 23, the TSW 24, and the system bus I/F control section 25.

When a signal arrives at the KTS 1 over the analog network 3, the signal is delivered to the MODEM 36 by means of control of the CPU 31, the I/O control section 33, and the digital extension I/F section 38 of the maintenance card 12. Subsequently, the data set that has arrived at the MODEM 36 is stored in the memory 32 by means of the CPU 31 and the I/O control section 33. In contrast, when a signal arrives at the KTS 1 over the digital network 3, the signal is delivered to the serial-to-parallel converter 34 by means of control of the CPU 31, the I/O control section 33, and the digital extension I/F section 38 of the maintenance card 12. Subsequently, the thus-converted parallel data set is stored in the memory 32 by way of the CPU 31 and the I/O control section 33.

Upon completion of downloading of the data set through data communication by way of the analog/digital network 3, a decision is made in step S203 as to whether or not the KTS 1 is in an idle state. When the KTS 1 enters an idle state, all the ports of the analog/digital extension card 13 and the analog/digital outside line card 14 and the functions of the KTS 1 are deactivated in step S204 by means of control of the CPU 31, the I/O control section 33, and the digital extension I/F section 38.

After deactivation of the functions of the KTS 1, in step S205 the main program of the CPU 21 stored in the memory 22 of the CPU card 11 is saved in the memory 32 of the maintenance card 12 by means of control of the CPU 21, the I/O control section 23, the TSW 24, and the system bus control section 25 of the CPU card 11 and by means of control of the CPU 31, the I/O control section 33, and the digital extension I/F section 38 of the maintenance card 12.

After completion of saving of the main program, the main program downloaded and stored in the memory 32 of the maintenance card 12 is transferred to and rewritten in the memory 22 of the CPU card 11, by means of control of the CPU 21, the I/O control section 23, the TSW 24, and the system bus I/F control section 25 of the CPU card 11 and by means of control of the CPU 31, the I/O control section 33, and the digital extension I/F section 38 of the maintenance card 12.

After completion of rewriting of the main program in the memory 22 of the CPU card 11, the KTS 1 is started up again in step S207 by means of control of the CPU 21. After the KTS 1 has been started up again, the result of changing of the main program is notified to the PC 52 of the maintenance site 2 through B-channel data communication over the digital network or modem communication by way of the analog/digital network 3 and the MODEM/TA 51 under control of the CPU 21, the I/O control section 23, the TSW 24, and the system bus I/F control section of the CPU card 11 and under control of the analog/digital outside line card 14. Consequently, the changing of the main program is completed.

As mentioned above, as a result of changing of the main program of the CPU 21, which is one of the remote maintenance functions according to the present embodiment, in contrast with conventional changing of a main program which is performed through on-site exchange of memory or a CPU card, the main program can be changed without involving an enormous amount of cost and consumption of much time. Further, the main program is changed in the present embodiment through the procedures, i.e., a downloading step, a saving step, and a rewriting step. Accordingly, the analog/digital network 3 is used at the time of only program downloading and communication of changing results. The time during which the analog/digital network 3 is used can be minimized, thereby enabling effective use of a communications line. Further, the maintenance card 2 actively changes the main program when the KTS 1 has entered an idle state, thereby enabling effective utilization of a line and minimizing the influence of changing of the main program on the original operations of the KTS 1.

Next, the second remote maintenance function of the KTS 1 according to the present embodiment, i.e., the recovery of the KTS 1 from a failure, will be described in detail by reference to FIGS. 4 and 5. An explanation will now be given of recovery of the KTS 1 from a power failure that occurs during the changing of the main program of the CPU 21.

As mentioned above, in the first processing step, a main program to be changed is downloaded into the maintenance card 12 from the PC 52 of the maintenance site 2 by way of the MODEM/TA 51, the analog/digital network 3, and the analog/digital outside line card 14 of the KTS 1. In the second processing step, the main program stored in the memory 22 of the CPU card 11 is save into the memory 32 of the maintenance card 12. In the third processing step, the main program to be rewritten that has been downloaded into the memory 23 of the maintenance card 12 is transmitted to and rewritten in the memory 22 of the CPU card 11.

The recovery of the KTS 1 from a failure requires failure information recording means which records information regarding failures that occurs during the downloading operation, the saving operation, and the rewriting operation. A failure flag register 39 provided in the I/O control section 33 of the maintenance card 12 corresponds to the failure information recording means. The failure flag register 39 is constituted of flash memory in which stored data sets are not erased in the event of shutting off of power to the failure flag register 39. Further, recovery means corresponds to the CPU 31 of the maintenance card 12.

Figure 4:
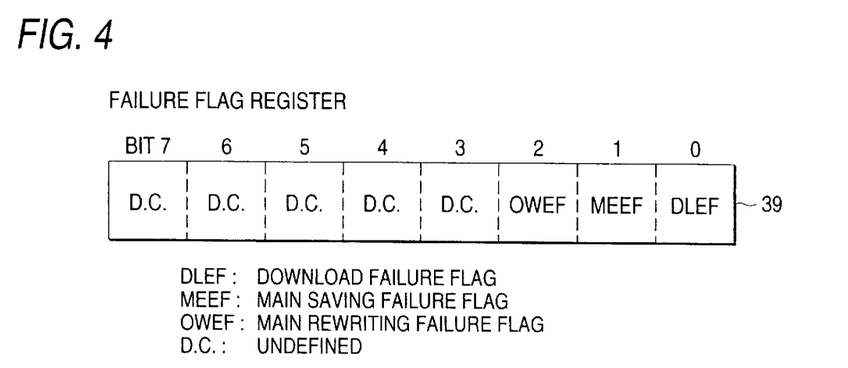
FIG. 4 is a diagrammatic representation for describing the configuration of bits of a failure flag register.

FIG. 4 shows the configuration of bits of the failure flag register 39. The 0th bit is defined as a download failure flag DLEF which is set in the event of a failure occurring during a downloading operation; the 1st bit is defined as a main saving failure flag MEEF which is set in the event of a failure occurring during the saving of the main program; and the 2nd bit is defined as a main rewrite failure flag OWEF which is set in the event of a failure occurring during the rewriting of the main program. The 3rd to 7th bits are undefined. As used herein, a failure is assumed to be a mismatch between data sets detected through comparison of the data sets in the event of a power failure during or after saving of the main program. In the present embodiment, although one bit of the failure flag register 39 is assigned to a failure occurring in each processing step, a plurality of bits are assigned to a failure occurring in each processing step. As a result, recovery of the KTS 1 from a failure can be carried out flexibly so as to correspond to the failure.

Figure 5:
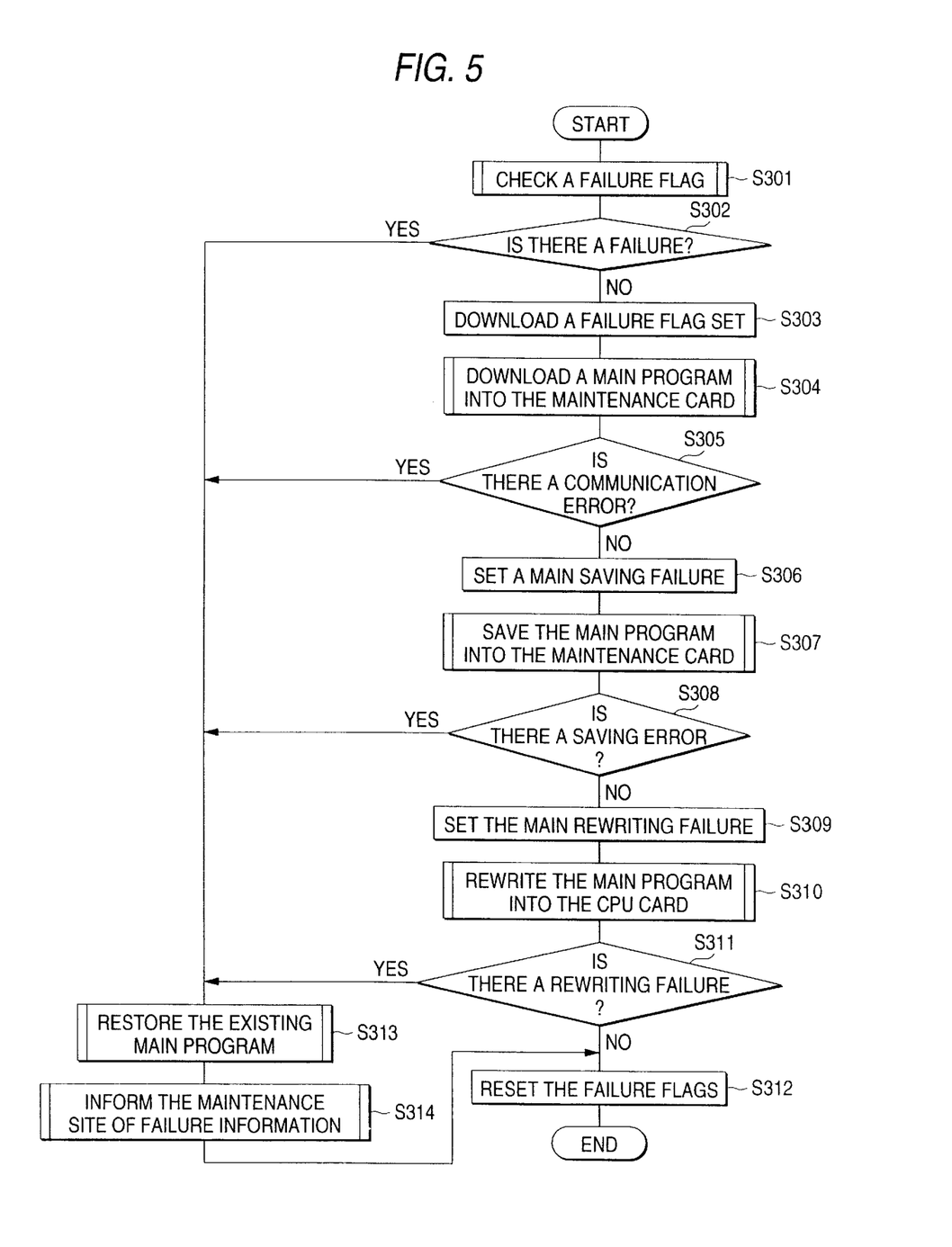
FIG. 5 is a flowchart for describing recovery of the key telephone system from a failure according to the present embodiment.

As shown in FIG. 5, in step S302, a check is made as to which of failure flags is flagged by reference to the failure flag register 39 provided in the I/O control section 33 of the maintenance card 12 (in step S301). If it has been found in step S302 that a failure flag is set, the processing proceeds to step S313. The existing main program is transmitted to the memory 22 of the CPU card 11 from the memory 32 of the maintenance card 12, thereby recovering the KTS 1 from the failure. In step S314, the KTS 1 is started up again by control of the CPU 21, and the KTS 1 is recovered according to the existing main program. A message declaring the occurrence of a failure is communicated to the PC 52 of the maintenance site 2 by means of B-channel data communication of a digital network or modem communication by way of the analog/digital network 3 and the MODEM/TA 51 by means of control of the CPU 21, the I/O control section 23, the TSW 24, and the system bus I/F section 25 of the CPU card 11 and by means of control of the analog/digital outside line card 14.

Further, if no failure flag is set in step S302, the processing proceeds to step S303, where a download failure flag DLEF is set in the failure flag register 39 provided in the I/O control section 33 under control of the CPU 31 before the main program to be rewritten is downloaded into the maintenance card 12 as the first error recovery processing. Subsequently, in step S304, the main program is downloaded into the memory 32 of the maintenance card 12. If power is shut off during the downloading of the main program in step S305 or if there is detected a mismatch between a main program before downloading and a main program after downloading through comparison after completion of downloading of the main program, the download failure flag DLEF remains set in the failure flag register 39. In step S305, a decision is made as to whether or not a failure has occurred during a downloading operation. If a failure has occurred, the existing main program is restored in step S313, and a failure notice is communicated to the maintenance site 2 in step S314. Further, when it is judged in step S315 that no failure has occurred during the downloading of the main program, the processing proceeds to step S306 and subsequent steps, wherein the existing main program is saved.

In step S306, a main saving failure flag MEEF is set in the failure flag register 39 provided in the I/O control section 33 under control of the CPU 31 before the main program stored in the CPU card 11 is saved in the memory 32 of the maintenance card 12 as the second error recovery processing. In step S307, the main program is saved in the memory 32 of the maintenance card 12. If power is shut off at the time of saving operations in step S307 or if there is detected a mismatch between the main program before saving and the main program after saving through comparison after completion of saving of the main program, the main saving failure flag remains set in the failure flag register 39. In step S308, a decision is made as to whether or not a failure has occurred during saving of the main program. If a failure has occurred, the existing main program is restored in step S313, and a failure notice is communicated to the maintenance site 2 in step S314. Further, when it is judged in step S308 that no failure has occurred during the saving of the main program, the processing proceeds to step S309 and subsequent steps, wherein the main program is rewritten.

In step S309, the main rewrite failure flag OWEF is set in the failure flag register 39 provided in the I/O control section 33 under control of the CPU 31 before the main program to be rewritten that has been downloaded in the memory 32 of the maintenance card 12 is transmitted to the memory 22 of the CPU card 11 as the third error recovery processing. In step S310, the main program is rewritten in the memory 22 of the CPU card 11. If power is shut off during the rewriting of the main program in step S310 or if there is detected a mismatch between the main program before rewriting and the main program after rewriting through comparison after rewriting of the main program, the main rewrite failure flag OWEF remains set in the failure flag register 39. Further, a decision is made in step S311 as to whether or not a failure has occurred during rewriting of the main program. If a failure has occurred, the existing main program is restored in step S313, and a failure notice is communicated to the maintenance site 2 in step S314. Further, when it is judged in step S311 that no failure has occurred during the rewriting of the main program, the processing proceeds to step S312, where the failure flags DLEF, MEEF, and OWEF set in the failure flag register 39 provided in the I/O control section 33 are reset under control of the CPU 31.

As mentioned above, even if a failure arises during the rewriting of the main program, the KTS 1 can recover from the failure by means of the existing main program through the failure recovery processing which is one of the remote maintenance functions according to the present embodiment. Further, the CPU 31 monitors the contents of the failure flag register 39 provided in the I/O control section 33 and can judge when the failure has occurred; i.e., in the download step, in the saving step, or in the rewriting step. As a result, the rewriting of the main program can be resumed from the process in which the failure occurred. Further, since the rewriting operation is resumed from the process in which the failure occurred, the time required for completing rewriting of the main program can be shortened. Moreover, even when a failure occurs in any of the processes of rewriting the main program (i.e., in the download step, the saving step, or the rewriting step), the KTS 1 can start up again and recover from the failure by means of the existing main program.

Figure 6:
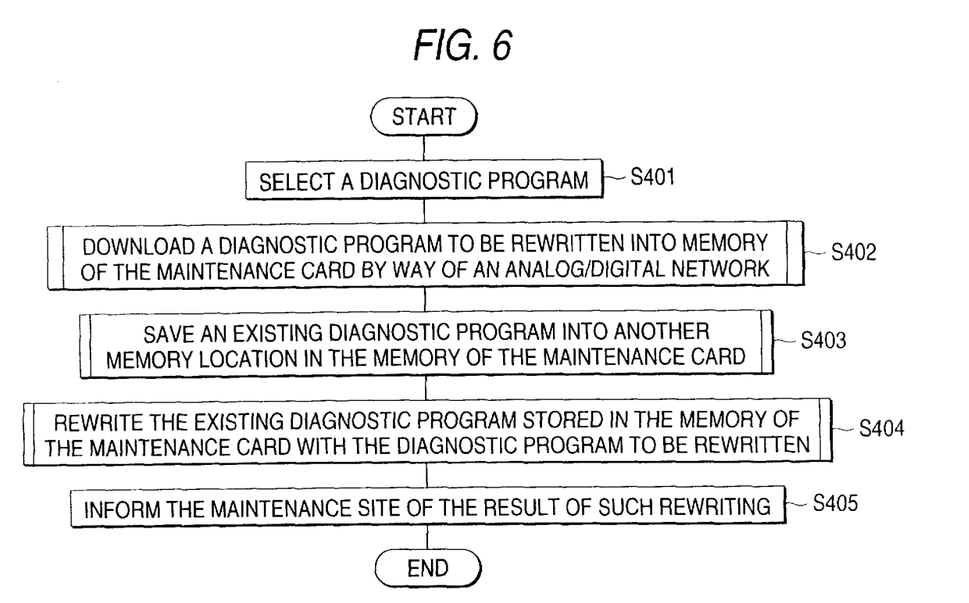
FIG. 6 is a flowchart for describing rewriting of a diagnostic program of the key telephone system according to the present embodiment.
Figure 7:
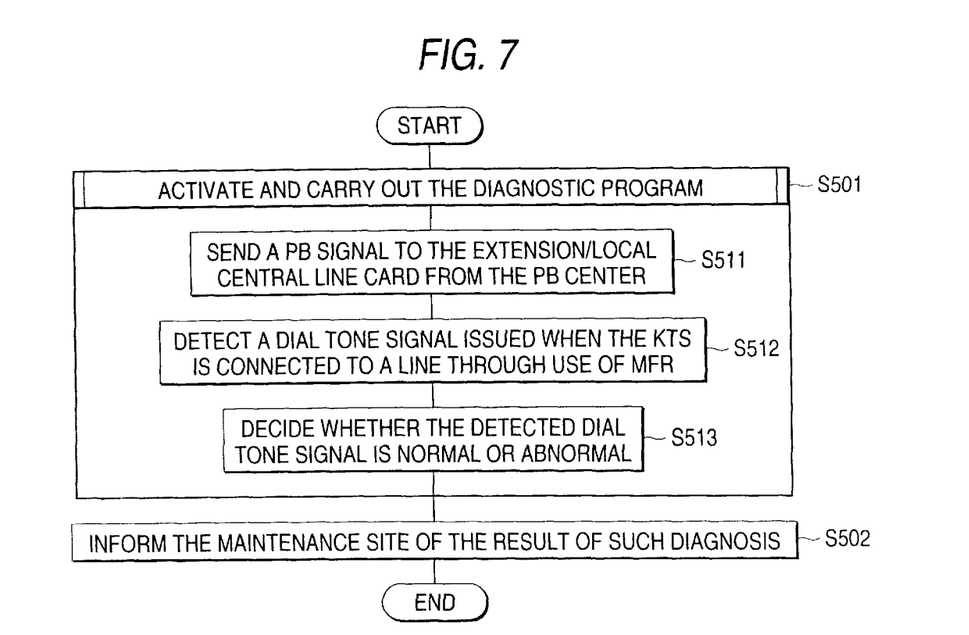
FIG. 7 is a flowchart for describing diagnostic processing of the key telephone system according to the present embodiment.

Next, the third remote maintenance function of the KTS 1 according to the present embodiment, i.e., the rewriting of the diagnostic program and the diagnostic processing performed by the diagnostic program, will be described in detail by reference to FIGS. 6 and 7. Here, it is assumed that an existing diagnostic program is stored in a predetermined area of the memory 32 of the maintenance card 12. A term "diagnostic means" referred to in the appended claims corresponds to a MFR 35 and a PB signal sender 37.

The rewriting of the diagnostic program stored in the memory 32 of the maintenance card 12 will be described by reference to FIG. 6. In step S401, the PC 52 provided at the maintenance site 2 selects a diagnostic program to be rewritten. In step S402, the thus-selected diagnostic program is downloaded into another memory location of the memory 32 of the maintenance card 12 by way of the analog/digital network 3. The downloading of the diagnostic program is identical with the downloading of the main program.

In step S403, the existing diagnostic program stored in the memory 32 is saved in another memory location of the memory 32 under control of the CPU 31 of the maintenance card 12. After completion of saving of the existing diagnostic program, the existing diagnostic program stored in the memory 32 is rewritten with the downloaded diagnostic program to be rewritten under control of the CPU 31 of the maintenance card 12 in step S404.

Upon completion of rewriting of the diagnostic program, a program rewrite completion notice is communicated to the CPU card 11 in step S405 under control of the CPU 31, the I/O control section 33, and the digital extension I/F control section 38 of the maintenance card 12. Subsequently, the result of rewriting of the diagnostic program is communicated to the PC 52 of the maintenance site 2 by way of the analog/digital network 3 and the MODEM/TA 51 over B-channel data communication of a digital network or modem communication by means of control of the CPU 21, the I/O control section 23, the TSW 24, and the system bus I/F section 25 of the CPU card 11 and by means of control of the analog/digital outside line card 14. As a result, the rewriting of the diagnostic program is completed.

The diagnostic processing according to the present embodiment will now be described by reference to FIG. 7. FIG. 7 is a flowchart showing ordinary diagnostic procedures. In step S501, an arbitrary diagnostic program rewritten in the memory 32 of the maintenance card 12 by means of the existing diagnostic program or through the foregoing rewriting operations is periodically started up under control of the CPU 31.

In step S511, a PB signal is sent from the PB signal sender 37 to the analog/digital extension card 13 or the analog/digital outside line card 14. In step S512, the MFR 35 detects a dial tone signal when the KTS 1 is connected to an analog/digital extension line or outside line. In step S513, under control of the I/O control section 33 and the MER 35, a decision is made as to whether the thus-detected dial tone signal is normal or abnormal.

After completion of diagnosis of all the analog/digital extension lines or outside lines, the result of diagnosis is communicated to the PC 52 by way of the analog/digital network 3 and the MODEM/TA 51 over B-channel data communication of a digital network or modem communication by means of control of the CPU 21, the I/O control section 23, the TSW 24, and the system bus I/F section 25 of the CPU card 11 and by means of control of the analog/digital outside line card 14.

The foregoing explanation has described a common diagnostic operation, and the details of diagnostic operations will differ according to an object of diagnosis. Representative objects of diagnosis and their corresponding diagnostic operations are provided below.

(1) Analog Public Network Office Central Line: An outside line is specified, and a zero call is originated. A resultant dial tone (DT) signal is then detected.

(2) ISDN Basic Line: After the KTS has been connected to an ISDN line, a call is originated to a dial-in office central line of the KTS 1 or to an actual local telephone number. A resultant dial tone (DT) signal is then detected.

(3) G3 facsimile (NCU): A call is originated to the facsimile number of an intra-office facsimile through zero-call origination, and a resultant dial tone signal is detected.

(4) ISDN Telephone: A call is originated to an intra-office ISDN terminal through zero-call origination, and a resultant dial tone signal is detected.

(5) Digital Extension Line Terminal: After a line has been called up by means of an automatic incoming call response request, call information (e.g., an extension number/presence or absence of an terminal/whether or not a line is engaged/whether or not the called terminals is being rung). A tone signal is sent to the terminal that has automatically responded to the calling signal, thereby determining whether or not the received terminal is a speaker phone.

(6) Analog Extension Terminal (SLT): After an extension line has been called up, a CNG signal is sent to thereby detect an ANS signal.

As has been mentioned above, by means of the rewriting of the diagnostic program and the diagnostic operation performed by the diagnostic program which are included in the remote maintenance function according to the present embodiment, the existing diagnostic program previously stored in the memory 32 of the maintenance card 12 or an arbitrary diagnostic program downloaded from the maintenance site 2 is executed, and the result of such diagnosis is communicated to the maintenance site 2. Accordingly, even when the KTS 1 is installed in a remote location, a failure of the KTS 1 can be immediately diagnosed at low cost without direct dispatch of a service technician to the location where the KTS 1 is installed. Further, a diagnostic program can be rewritten from the maintenance site 2, and hence a relevant diagnostic program corresponding to the installation conditions of the KTS 1 or to the failure of the KTS 1 can be flexibly and immediately provided and activated.

As has been described above, in the key telephone system, the key telephone system maintenance method, and the recording medium according to the present invention, the download means downloads a program to be rewritten into the second storage means from the external device (in the download step), and the control means saves the program stored in the storage means into the second storage means (in the saving step). The control means rewrites the downloaded program stored in the second storage means into the storage means through transmission (in the rewriting step). As a result, there can be provided a key telephone system capable of immediately and inexpensively rewriting a program for controlling the operations of the key telephone system, a maintenance method for the key telephone system, and a medium recording a program for executing the maintenance method.

Further, in the key telephone system, the key telephone system maintenance method, and the recording medium according to the present invention, the download means downloads a program to be rewritten into the second storage means from the external device (in the download step), and the control means saves the program stored in the storage means into the second storage means (in the saving step). The control means rewrites the downloaded program stored in the second storage means into the storage means through transmission (in the rewriting step). The failure information recording means (in the failure information recording step) records information regarding at least failures that have been caused by the downloading action of the download means (in the download step), failures that have been caused by the saving action of the control means (in the saving step), and failures that have been caused by the rewriting action of the control means (in the rewriting step). Further, in the event of a failure, the recovery means recovers the key telephone system (in the recovery step) by reference to the failure information recorded by the failure information recording means (in the failure information recording step). As a result, by reference to the recorded failure information, a decision is made as to when a failure has occurred; i.e., in the download step, in the saving step, and in the rewriting step. The rewriting of the main program can be resumed from the processing step where the failure occurred. So long as the processing is resumed from the processing step where the failure occurred after recovery of the key telephone system, the time required to rewrite the program can be eventually shortened.

Further, in the key telephone system, the key telephone system maintenance method, and the recording medium according to the present invention, the download means downloads a program to be rewritten into the second storage means from the external device (in the download step), and the control means saves the existing program stored in the storage means into another memory location of the second storage means (in the saving step). The control means rewrites the existing program in the second storage means with the diagnostic program downloaded in the second storage means. According to the diagnostic program stored in the second storage means, the diagnostic means diagnoses the state of a line connected to the key telephone system through transmission and receipt of a signal (in the diagnosing step). Thus, the existing diagnostic program previously stored in the second storage means or an arbitrary diagnostic program downloaded from a external device is executed. As a result, even when a key telephone system is installed in a remote location, a failure of the key telephone system can be diagnosed. More specifically, the key telephone system can be immediately and inexpensively diagnosed without direct dispatch of a maintenance technician to the location where the key telephone system is installed. Further, since the diagnostic program can be changed by way of the external device, a relevant diagnostic program corresponding to the location—where the key telephone system is installed and a failure of the key telephone system can be immediately and flexibly activated.

Further, in the key telephone system, the key telephone system maintenance method, and the recording medium according to the present invention, the result of processing performed by the control means (in the rewriting step), and the failure information recorded in the failure information recording means (in the failure information recording step) or the result of diagnosis performed by the diagnostic means (in the diagnostic step) are preferably notified to the external device. The external device is connected to the key telephone system by way of an analog/digital network so as to remotely control the key telephone system. As a result, rewriting of the program of the key telephone system, the recovery of the key telephone system from a failure, and system diagnosis can be flexibly and immediately carried out without direct dispatch of a maintenance technician to the location where the key telephone system is installed. Thus, there can be provided a key telephone system which enables rewriting of the main program of the key telephone system, the recovery of the key telephone system from a failure, and system diagnosis in a remote, immediate, flexible, and inexpensive manner.

What is claimed is:

1. A key telephone system comprising:

first storage means which stores a program said program being one of a main program and an alternative program;

operation control means which, in a first state, operates and controls the key telephone system through execution of the main program stored in the first storage means and, in a second state, operates and controls the key telephone system through execution of the alternative program stored in the first storage means;

second storage means which stores the other one of the main program and the alternative program;

downloading means which downloads from an external device a program to be rewritten to the second storage means;

storage control means which saves the program stored in the first storage means into the second storage means and which transmits and rewrites the program stored in the second storage into the first storage means;

failure information recording means which records information regarding at least failures that occur during the downloading of the program by the downloading means and failures that occur during the saving and rewriting of the programs by the control means; and recovery means which recovers the key telephone system by reference to the failure information recorded in the failure information recording means.

2. A key telephone system comprising:

first storage means which stores a program;

operation control means which operates and controls the key telephone system through execution of the program stored in the first storage means;

second storage means which stores a diagnostic program;

downloading means which downloads from an external device an alternative diagnostic program to be written to the second storage means;

storage control means which saves a diagnostic program, which is stored in a first area of the second storage means, into a second area of the second storage means and which transmits and rewrites the alternative diagnostic program, which is stored in the second areas, into the first area; and diagnostic means that diagnoses, through transmission and reception of a signal, the state of a line connected to the key telephone system according to a diagnostic program stored in the second area the second storage means.

3. The key telephone system as defined in any one of claims 1 and 2 wherein the second storage means, the downloading means, the storage control means, the failure information recording means, and the recovery means or the diagnostic means are assembled and handled as a single module.

4. The key telephone system as defined in any one of claims 1 through 2, wherein at least one of a result of processing performed by the storage control means, a failure information recorded in the failure information recording means and a result of diagnosis performed by the diagnostic means are communicated to the external device.

5. The key telephone system as defined in any one of claims 1 through 2, wherein the external device is connected to the key telephone system by way of an analog or digital network, so that the key telephone system is remotely controlled.

6. A method of performing maintenance of a key telephone system including storage means which stores a program and operation control means which operates and controls the key telephone system through execution of the program stored in the storage means, the key telephone system maintenance method comprising:

a download step for downloading from an external device an alternative program to be rewritten to second storage means;

a saving step for saving the program stored in the storage means into the second storage means;

a rewriting step for transmitting and rewriting the alternative program stored in the second storage means into the storage means;

a failure information recording step for recording information regarding at least failures that occur in the download step, the saving step, and the overwriting step, and a recovery step for recovering the key telephone system by reference to the failure information recorded in the failure information recording step.

7. A method of performing maintenance of a key telephone system including storage means which stores a program and operation control means which operates and controls the key telephone system through execution of the program stored in the storage means, the key telephone system maintenance method comprising:

a download step for downloading from an external device an alternative diagnostic program to be rewritten to second storage means;

a saving step for saving an existing program having been stored in the storage means to the second storage means;

a rewriting step for transmitting and rewriting the alternative program stored in the second storage means into the storage means; and a diagnosing step for diagnosing the state of a line connected to the key telephone system according to a diagnostic program stored in the second storage means, through transmission and receipt of a signal.

8. The key telephone system maintenance method as defined in any one of claims 6 through 7, wherein the result of processing performed by the control means, and the failure information recorded in the failure information recording means or the result of diagnosis performed by the diagnostic means are communicated to the external device.

9. The key telephone system maintenance method as defined in any one of claims 6 through 7, wherein the external device is connected to the key telephone system by way of an analog or digital network, so that the key telephone system is remotely controlled.

10. A computer-readable recording medium storing a program for causing a computer to execute the key telephone system maintenance method as defined in any one of claims 6 through 7.

* * * * *

UNITED STATES PATENT AND TRADEMARK OFFICE
CERTIFICATE OF CORRECTION

PATENT NO.    : 6,301,345 B1
DATED         : October 9, 2001
INVENTOR(S)   : Suzuki It is certified that error appears in the above-identified patent and that said Letters Patent is hereby corrected as shown below:

Column 14,
Line 34, after "system" (second occurrence), please insert -- - -- (hyphen).

Column 15,
Line 31, please delete "areas" and insert -- area --.

Signed and Sealed this

Twenty-seventh Day of August, 2002

Attest:

JAMES E. ROGAN
Attesting Officer                Director of the United States Patent and Trademark Office